United States Patent
Fried et al.

[11] Patent Number: 6,094,581
[45] Date of Patent: Jul. 25, 2000

[54] TAILORED HIERARCHICAL CELL STRUCTURES IN A COMMUNICATIONS SYSTEM

[75] Inventors: Tomas Fried, Bromma; Erik Westerberg, Hägersten; Sten Hermansson, Sköndal, all of Sweden

[73] Assignee: Telefonaktiebolaget LM Ericsson, Stockholm, Sweden

[21] Appl. No.: 08/872,065

[22] Filed: Jun. 10, 1997

[51] Int. Cl.[7] ........................................................ H04B 7/00
[52] U.S. Cl. .......................... 455/449; 455/517; 455/524; 455/512
[58] Field of Search .................................... 455/449, 450, 455/451, 452, 437, 444, 455, 517, 524, 440, 512

[56] References Cited

U.S. PATENT DOCUMENTS

| | | |
|---|---|---|
| 5,175,867 | 12/1992 | Wejke et al. . |
| 5,251,249 | 10/1993 | Allen et al. . |
| 5,353,332 | 10/1994 | Raith et al. . |
| 5,404,580 | 4/1995 | Simpson et al. . |
| 5,444,764 | 8/1995 | Galecki . |
| 5,499,386 | 3/1996 | Karlsson . |
| 5,548,806 | 8/1996 | Yamaguchi et al. . |
| 5,590,397 | 12/1996 | Kojima . |
| 5,615,249 | 3/1997 | Solondz ................................... 455/450 |
| 5,627,877 | 5/1997 | Penttonen . |
| 5,752,193 | 5/1998 | Scholefield et al. ..................... 455/527 |
| 5,812,950 | 9/1998 | Tom ........................................ 455/440 |

FOREIGN PATENT DOCUMENTS

| | | |
|---|---|---|
| 0 505 106 A2 | 9/1992 | European Pat. Off. . |
| 0 538 014 A2 | 4/1993 | European Pat. Off. . |
| 0 641 137 A2 | 3/1995 | European Pat. Off. . |
| 2-143725 | 6/1990 | Japan . |
| WO95/07010 | 3/1995 | WIPO . |
| WO 96/07288 | 3/1996 | WIPO . |

OTHER PUBLICATIONS

Gérald Mazziotto, "The Subscriber Identity Module for the European Digital Cellular System GSM and Other Mobile Communication Systems", International Switching Symposium 1992, Proceedings vol. 1, Yokohama, Japan, Oct. 25–30, 1992, pp. 113–1116.

"Digital Cellular Telecommunications System (Phase 2); Radio Subsystem Link Control (GSM 05.08) ETSI", ETS 300 578, Jan. 1997, Eighth Edition, 49 pages.

"Digital Cellular Telecommunications System (Phase 2); Functions Related to Mobile Station (MS) in Idle Mode (GSM 03.22) ETSI", ETS 300 535, Sep. 1996, Fourth Edition, 44 pages.

Michel Mouly, et al., The GSM System for Mobile Communications, International Standard Book Number 2–9507190–0–7, 1992, pp. 332–333, 426–429, 442–443, 452–459.

GSM Recommendation 05.08, "Radio Sub–System Link Control", published by ETSI, Released Jan. 1991, Version 3.7.0, 38 pages.

*Primary Examiner*—Reinhard J. Eisenzopf
*Assistant Examiner*—Sam Bhattacharya
*Attorney, Agent, or Firm*—Burns, Doane, Swecker & Mathis, L.L.P.

[57] ABSTRACT

A server for use by a designated one of a number of mobile units in a cellular communications system including a plurality of cells having different service areas with respect to one another may be selected by, for each of the mobile units, assigning to each cell a category of preference for selection with respect to each other cell within the system, wherein for at least one of the cells, the assigned category of preference associated with a first mobile unit is different from the assigned category of preference associated with a second mobile unit. Then, for the designated mobile unit, the assigned category of preference for each of a number of candidate cells is determined. A first one of the candidate cells is then selected as serving cell for the designated mobile unit based upon whether the first one of the candidate cells has a higher category of preference than another of the candidate cells. Because categories of preference may differ for different mobile units, location-based services, based on categories of subscribers, may be provided. In other embodiments, a radio network may be optimized with respect to varying capabilities of installed radio base equipment.

14 Claims, 7 Drawing Sheets

TAILORED HIERARCHICAL CELL STRUCTURES IN A COMMUNICATIONS SYSTEM

BACKGROUND

The present invention relates to radiocommunication systems (e.g., cellular or satellite systems), and more particularly to techniques for steering radio traffic to preferred servers (e.g., base stations) when more than one candidate server exists.

In today's advanced radio networks, there is a growing need for the ability to differentiate between different categories of end users. This may be for marketing purposes or to improve the overall performance of the radio network or both. An example of a marketing-driven reason for end user differentiation would be an operator's desire to guarantee that selected customers receive a certain quality of service. As to network performancerelated reasons for differentiating between different end users, this is connected to the evolution of more and complex radio networks. New services are continuously being introduced, such as packet switched data transfer (GPRS in GSM, Packet Data Service in PDC) and half-rate voice coders in GSM. New mobile telephony services are also being introduced, such as additional frequency bands (e.g., DCS 1800 and the E-band in GSM). Novel functionality is usually introduced in an inhomogeneous fashion so that a given cell may be able to provide a certain combination of services that differs from the combination of services made available in other cells.

Moreover, the mobiles (end users) have different capabilities. To optimize the overall performance of the radio network, one needs to assign a cell for servicing a mobile on the basis of the mobile's capability and characteristics as well as the functionality of the cells. It can be expected that as the radio networks become more complex in the future, the demand for a useful solution to his problem will increase accordingly.

U.S. Pat. No. 5,499,386, issued to Karlsson on Mar. 12, 1996, discloses a multi-level layered cellular radio architecture that serves mobile subscriber stations moving within the system. Best server selection is performed for the mobile stations by assigning within each cell a preference value to each other one of the cells with which is associated by proximity of service area. The strength of the radio signal received by the mobile from the serving cell as well as the radio channels of associated cells is measured. A decision as to the best serving cell for the mobile station is made based upon both the preference value of the associated cells and the signal strength of their respective radio channels. In this manner, a Hierarchical Cell Structure (HCS) is established.

Other methods for ensuring that indoor traffic is carried by indoor cells are variants of the HCS functionality that is concerned with static traffic control (as opposed to HCS functionality designed to handle fast moving mobiles). As an example, see GSM Recommendation 05.22, published by ETSI. Methods for differentiated access to certain areas include functions that use defined subscriber groups to allow/restrict call setup.

The above-described known techniques have shortcomings in that they either give all subscribers the same preference to cells (layer designation, priority), or differentiated access depending on subscription. However, none are capable of optimizing the overall performance of the radio network by assigning a cell for servicing a mobile on the basis of the mobile's capability and characteristics as well as the functionality of the cells. Furthermore, none are able to implement different hierarchies depending on type of subscription.

SUMMARY

It is therefore an object of the present invention to provide a radio network that is optimized with respect to varying capabilities of installed radio base equipment.

It is a further object of the present invention to provide location-based services in a cellular communications system, based on categories of subscribers.

In accordance with one aspect of the present invention, the foregoing and other objects are achieved in methods and apparatus for selecting a server for use by a designated one of a number of mobile units in a cellular communications system comprising a plurality of cells having different service areas with respect to one another. The techniques comprise the steps of, for each of the mobile units, assigning to each cell a category of preference for selection with respect to each other cell within the system, wherein for at least one of the cells, the assigned category of preference associated with a first mobile unit is different from the assigned category of preference associated with a second mobile unit. Then, for the designated mobile unit, the assigned category of preference is determined for each of a number of candidate cells. A first one of the candidate cells is selected as serving cell for the designated mobile unit based upon whether the first one of the candidate cells has a higher category of preference than another of the candidate cells.

In another aspect of the invention, a cell is assigned for use by a designated one of a plurality of mobile units in a cellular communications system comprising a plurality of cells having different service areas with respect to one another, wherein the plurality of mobile units includes at least one mobile unit of a first mobile type that has a predefined capability, and at least one mobile unit of a second mobile type that does not have the predefined capability, and the plurality of cells includes at least one cell of a first cell type that supports the predefined capability and at least one cell of a second cell type that does not support the predefined capability. The predefined capability may be, for example, half-rate voice coder capability. In alternative embodiments, the predefined user group may be a group comprising at least one test mobile unit. The techniques comprise the steps of: a) attempting to assign a cell of the first cell type to the designated mobile unit before attempting to assign a cell of the second cell type to the designated mobile unit if the designated mobile unit is of the first mobile type; and b) attempting to assign a cell of the second cell type to the designated mobile unit before attempting to assign a cell of the first cell type to the designated mobile unit if the designated mobile unit is of the second mobile type.

In another aspect of the invention, step a) comprises the steps of defining a first level of cells to be cells of the first cell type; defining a second level of cells to be cells of the second type; and defining a third level of cells to be no cells. Then, an attempt is first made to assign a cell from the first level of cells to the designated mobile unit. If no cell from the first level of cells has been assigned, then an attempt is made to assign a cell from the second level of cells to the designated mobile unit. If no cell from the first or second levels of cells has been assigned, then an attempt is made to assign a cell from the third level of cells to the designated mobile unit. Similarly, step b) may comprise the steps of defining a first level of cells to be no cells; defining a second level of cells to be cells of the second type; and defining a third level of cells to be cells of the first type. An attempt is then made to assign a cell from the first level of cells to the designated mobile unit. If no cell from the first level of cells has been assigned, then an attempt is made to assign a cell from the second level of cells to the designated mobile unit. If no cell from the first or second levels of cells has been assigned, then an attempt is made to assign a cell from the third level of cells to the designated mobile unit.

In yet another aspect of the invention, a cell is assigned for use by a designated one of a plurality of mobile units in a cellular communications system comprising a plurality of cells having different service areas with respect to one another, wherein the plurality of mobile units includes at least one mobile unit of a first mobile type associated with a predefined user group, and at least one mobile unit of a second mobile type that is not associated with the predefined user group, and the plurality of cells includes at least one cell of a first cell type that is associated with the predefined user group and at least one cell of a second cell type that is not associated with the predefined user group. The predefined user group may be, for example, a group of company employees. In alternative embodiments, the predefined user group may be a group comprising at least one test mobile unit. The techniques comprise the steps of: a) attempting to assign a cell of the first cell type to the designated mobile unit before attempting to assign a cell of the second cell type to the designated mobile unit if the designated mobile unit is of the first mobile type; and b) attempting to assign a cell of the second cell type to the designated mobile unit before attempting to assign a cell of the first cell type to the designated mobile unit if the designated mobile unit is of the second mobile type.

In still another aspect of the invention, step a) comprises the steps of defining a first level of cells to be cells of the first cell type, defining a second level of cells to be cells of the second type, and defining a third level of cells to be no cells. Then, an attempt is made to assign a cell from the first level of cells to the designated mobile unit. If no cell from the first level of cells has been assigned, then an attempt is made to assign a cell from the second level of cells to the designated mobile unit. If no cell from the first or second levels of cells has been assigned, then an attempt is made to assign a cell from the third level of cells to the designated mobile unit.

Similarly, step b) comprises the steps of defining a first level of cells to be no cells, defining a second level of cells to be cells of the second type, and defining a third level of cells to be cells of the first type. Then, an attempt is made to assign a cell from the first level of cells to the designated mobile unit. If no cell from the first level of cells has been assigned, then an attempt is made to assign a cell from the second level of cells to the designated mobile unit. If no cell from the first or second levels of cells has been assigned, then an attempt is made to assign a cell from the third level of cells to the designated mobile unit.

BRIEF DESCRIPTION OF THE DRAWINGS

The objects and advantages of the invention will be understood by reading the following detailed description in conjunction with the drawings in which.

DETAILED DESCRIPTION

Figure 1:
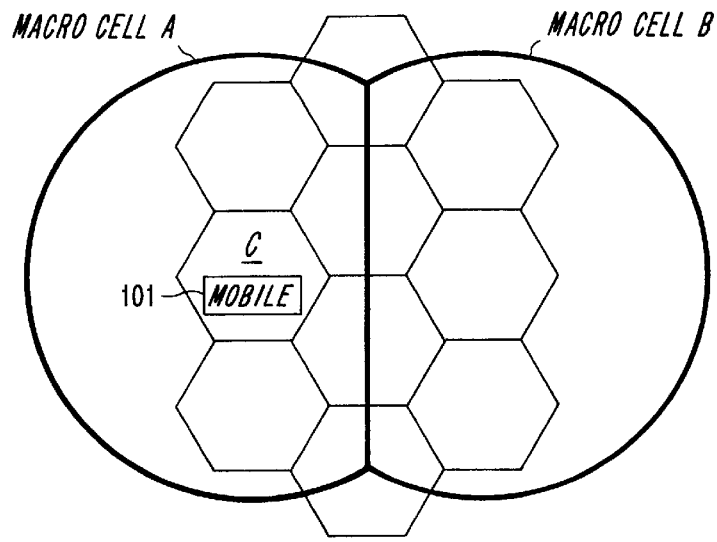
FIG. 1 is a block diagram illustrating a portion of a communications system in which two macro cells, A and B, overlap a region of micro cells that includes the micro cell C, in accordance with one aspect of the invention.

The various features of the invention will now be described with respect to the figures, in which like parts are identified with the same reference characters.

In accordance with one aspect of the invention, each cell (e.g., macro cell, micro cell, pico cell) in a cellular communications system is assigned to a particular priority level, hereinafter referred to as a "layer." Whenever a mobile unit is in a (radio) position to choose between several cells, a cell is selected from the lowest possible layer, according to certain rules, such as those that take into account signal strength measurements, signal quality measurements and layer designation. This aspect is referred to herein as a hierarchical cell structure (HCS). U.S. Pat. No. 5,499,386 to Karlsson discloses techniques for implementing HCS in a cellular radio system, and is hereby incorporated herein by reference.

HCS may be implemented in any of a number of ways. In a fixed cell layer designation strategy, each cell is assigned a layer identity that indicates its relative category of preference for selection with respect to all other cells in the system, regardless of which cell is currently serving a subject mobile unit. For example, each cell in the system may be assigned to one of four priority layers, which assignment does not change as a function of which cell is currently serving a given mobile unit. To illustrate this case, suppose four cells, respectively designated A, B, C and D, are respectively assigned to layers "4", "3", "2" and "1", with layer "1" indicating the highest priority and layer "4" indicating the lowest priority. Given a mobile unit currently serviced by cell A, an attempt would first be made to establish a connection through cell D, because this is the highest priority cell. If this connection cannot be established (e.g., if the quality of the connection will not be high enough, or if cell D is already overloaded with traffic), an attempt would then be made to establish a connection through the next highest priority cell and so on until the connection is established. This work can be performed entirely by components located in the public land mobile network (PLMN), or it can be performed within the mobile unit itself after the mobile unit has been supplied with information (e.g., via a control channel) about the fixed priority levels of the candidate cells.

In an alternative embodiment, as described in U.S. Pat. No. 5,499,386 to Karlsson, relative priority designations are used, whereby neighboring cells to the one which is currently serving the mobile unit are characterized as "non-preferred neighbor", "equal preference neighbor", or "preferred neighbor". Any one cell's characterization is not fixed, but instead depends on which cell is the currently serving cell. For example, suppose a system includes the same four cells A, B, C and D mentioned above, and that it is desired for a mobile unit to establish its connection through cell D whenever possible, and to give next highest priority to establishing a connection through cell C. Further assume that if the connection cannot be established through either of cells C and D, then it is desired to establish the connection through cell B if possible. In this example, if the mobile unit is presently served by cell A, it would see each of cells B, C and D being characterized as "preferred neighbors." Because cells B, C and D all appear to have the same priority, a handoff may be made so that the mobile is served by cell B. Now, however, the mobile unit would see cell A characterized as a "non-preferred neighbor," and each of cells C and D being characterized as "preferred neighbors". (Note that cell B is no longer seen as being equal priority with cells C and D.) Another handoff may result in the mobile unit being served by cell C. From this vantage point, the mobile unit would see each of cells A and B being characterized as "non-preferred neighbors", and cell D being characterized as a "preferred neighbor." Thus another handoff attempt would be made, this time to cell D.

It can be seen from the above two examples that the same objective can be achieved with either fixed or relative priority designations. An advantage of fixed priority designations is that the highest priority candidate cell is immediately known, so that an attempt can be made right off to establish the connection through the highest priority candidate cell. By comparison, the relative priority designation approach may require a number of handoffs to occur before the connection is being served by the ultimately highest priority cell. In exchange for this inefficiency, however, the relative priority designation approach has the advantage of not requiring an a priori definition of how many priority levels will be in the system. The relative priority designation technique also permits more complicated priority strategies to be imposed on the cells in a communication system.

To eliminate some of the inefficiency associated with having to perform a great number of handoffs in order to arrive at a highest priority cell in a relative priority designation system, the relative categories can be extended beyond the three that were mentioned above. For example, one might characterize cells as being (from lowest to highest priority): "two priority levels below the currently serving cell," "one priority level below the currently serving cell", "equal priority with the currently serving cell," "one priority level above the currently serving cell," or "two priority levels above the currently serving cell." Applying this to the example given above, the mobile unit being served by cell A could have seen cell B as being "one priority level above the currently serving cell," and each of cells C and D as being "two priority levels above the currently serving cell." This would have resulted in a handoff attempt to either of cells C and D, thereby avoiding the handoff to cell B.

This multiple relative layer designation technique is by no means limited to the five characterizations mentioned above, but can be extended to still greater numbers of relative layer designations as necessary. The drawback associated with defining greater numbers of relative layer designations is that more overhead is required to convey the more detailed information. This should be weighed against the advantages to be gained (e.g., fewer handovers) whenever a decision is to be made as to what sort, if any, of relative layer designation to use.

In the following discussion, examples that utilize the fixed cell layer designation strategy are shown. However, this is done merely for the purpose of illustrating the various aspects of the invention, and does not imply that use of the fixed cell designation strategy is an essential element of the invention. To the contrary, the various inventive techniques can easily be applied in a system that utilizes any of the relative priority designation strategies discussed above.

In another aspect of the invention, the layer identity of a cell varies as a function of which mobile unit is being considered or as a function of subscription characteristics. This aspect of the invention is referred to herein as "tailored HCS." Consequently, two mobile units located in essentially the same geographical location, might be assigned to different cells because of differences in some capability or characteristic of the mobile units or the subscription. For example, consider a portion of a communications system illustrated in FIG. 1, in which two macro cells, A and B, overlap a region of micro cells that includes the micro cell C. The macro cell A may be assigned a default layer of "2", and the micro cell C may be assigned a default layer of "1". When a mobile 101 is located within the geographical area defined by the micro cell C, its communications may be established through micro cell C if it's characteristics indicate that it should use default settings (micro cell C's default layer of "1" is a higher priority than macro cell A's default layer of "2"). However, under some circumstances, it may be advantageous to specify that this particular mobile unit 101 will not use the default settings for micro cell C, but will instead consider micro cell C to be assigned to layer 3. Consequently, when the mobile unit 101 is located in the geographical area defined by micro cell C, attempts will first be made to establish its communications through macro cell A (because layer "2" is a higher priority than layer "3"). Only if it is not presently possible to assign macro cell A to the communications will micro cell C be assigned for this purpose.

In this way, classes or groups of mobiles can be made to prioritize cells on an individual basis, in accordance with their capabilities and type of subscriptions. This provides a very powerful and flexible tool for handling a number of situations described in detail below.

A number of embodiments of the invention will now be described. It should be understood that the invention applies to any mobile system of any standard, such as GSM, GPRS, AMPS, D-AMPS, NMT, PDC, IS-661, and the like.

Three embodiments will now be described in which a radio network is optimized with respect to varying capabilities of installed radio base equipment. In a first embodiment, new services are introduced into a network in an inhomogeneous fashion. In other words, the new functionality is implemented in only a subset of the cells in, for example, a GSM network.

For example, consider the introduction of the packet switched data service, known as General Packet Radio Service (GPRS), into a GSM system. For cost reasons, it may be required that the new GPRS functionality be implemented only in macro cells. Considering again the portion of a communications system illustrated in FIG. 1, this would mean that GPRS capability is available from the macro cells A and B, and is not available from any of micro cells, including the micro cell C.

Assume that some mobile units in the network can switch continuously between GPRS and circuit switched mode (class B mobiles), and that some mobile units in the network can handle packet switched and circuit switched traffic in parallel (class A mobiles). In order to be able to use their GPRS capabilities and transfer data packets, it is necessary for the class A or class B mobiles, when in the GSM idle mode, to be camped on cells that have GPRS functionality. In this example, this would be either of the macro cells A or B.

In a conventional system, if a class A or B mobile unit 101 is engaged in a circuit switched activity while it is located within the geographical area defined by micro cell C, the regular HCS algorithm forces the mobile unit 101 into the micro cell layer (i.e., into a cell that lacks GPRS functionality). If the mobile unit 101 wants to initiate packet transfer while connected to the micro cell C, it has no way to request a handover to a cell with GPRS functionality. Consequently, the mobile unit 101 would be prohibited from using its GPRS capability while in circuit switched mode.

Figure 2A:
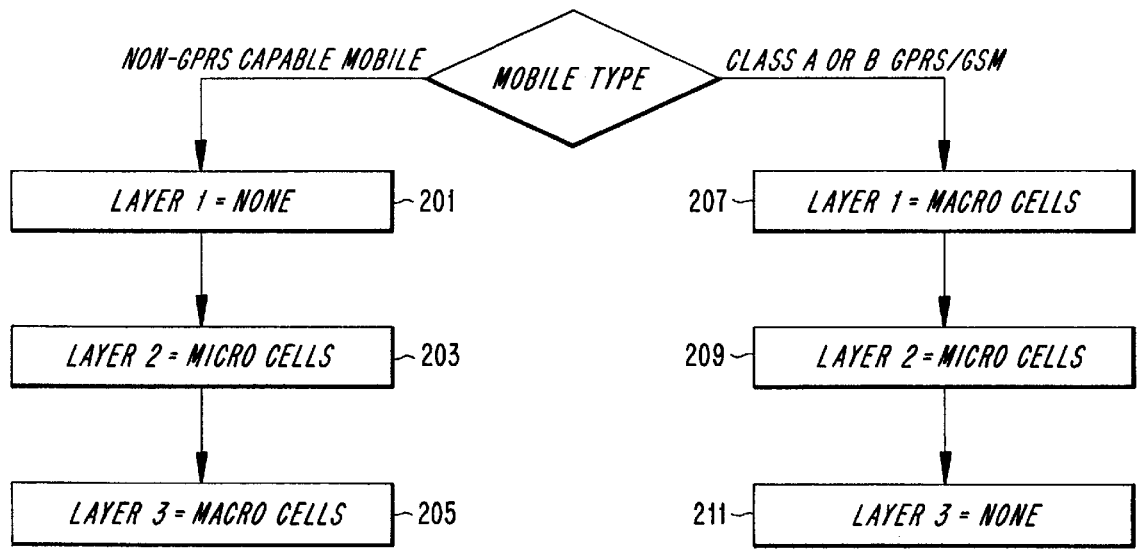
FIG. 2a is a flowchart depicting assignment of cells to priority levels as a function of mobile capability and cell capability, in accordance with one aspect of the invention.
Figure 2B:
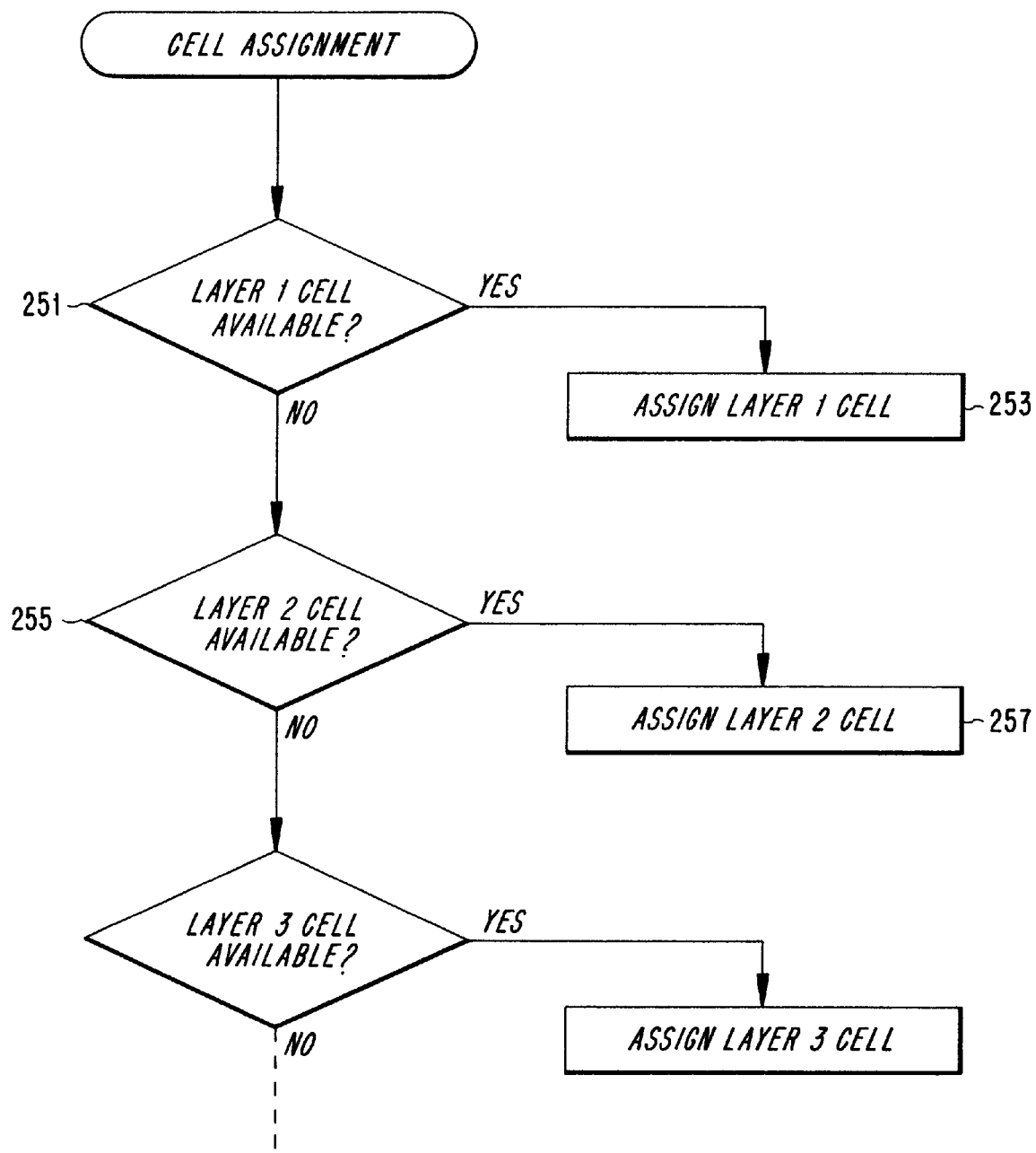
FIG. 2b is a flowchart for selecting a cell for serving a mobile unit, in accordance with one aspect of the invention.

In accordance with one aspect of the invention, as illustrated in FIG. 2a, this problem is solved by assigning micro cells to layer 2 (step 203) and assigning macro cells to layer 3 (step 205) as a default to be used by mobiles that do not have GPRS functionality. In this example, there are no cells to be assigned to layer 1 (step 201). However, for mobiles that are identified as class A or B GPRS/GSM mobiles, the layer structure is redefined so that cells with GPRS functionality (here the macro cells A and B) are assigned as layer 1 (step 207), while the remaining cells (here the micro cells, including micro cell C) are assigned as layer 2 (step 209). In this case, there are no cell types to be assigned to layer 3 (step 211). As illustrated in the flowchart of FIG. 2b, this assures that whenever possible, the HCS algorithm assigns circuit switched calls to/from a class A or B mobile unit 101 to a base station associated with a macro cell (e.g., macro cell A) having GPRS support (they are the only types of mobile units that will take the "yes" path out of decision block 251 and assign a layer 1 cell (step 253)), even if the mobile unit 101 is located in an area covered by the micro cell C. Non-class A or B mobile units 101 will always take the "no" path out of decision block 251, and test for available layer 2 cells (decision block 255). If a layer 2 cell is available, then it will be assigned (step 257). For non-class A or B mobile units 101, this means assigning a micro cell.

In another embodiment of the invention, the above-described approach may be used for optimizing a network for half-rate voice coder functionality. In particular, consider a micro/macro cell radio network, as illustrated in FIG. 1, having capacity problems. A system operator may attempt to battle this capacity problem by installing a GSM half-rate voice coder. However, for cost reasons, the operator may decide to install the half-rate functionality in the macro cells A and B, only.

In this situation, it is desirable to make subscribers having half-rate functionality communicate through one of the macro cells A and B whenever possible (even when a micro cell is available), while subscribers lacking the half-rate capability should continue to use micro cells when these are available. Of course, if a macro cell does not presently have the capacity to handle a subscriber having half-rate functionality, that subscriber should then, as a second choice, be permitted to access a micro cell, if one is nearby.

Figure 3:
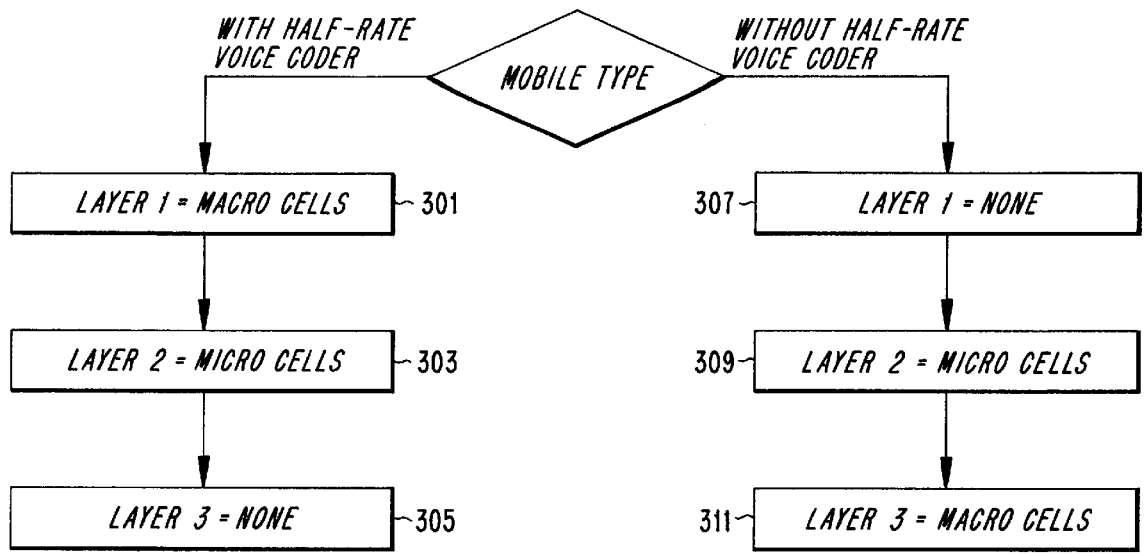
FIG. 3 is a flowchart depicting assignment of cells to priority levels as a function of mobile capability and cell capability, in accordance with another embodiment of the invention.

In accordance with one embodiment of the invention, as illustrated in the flowchart depicted in FIG. 3, this problem is solved by assigning all micro cells (e.g., the micro cell C) to layer 2 for all mobile units (steps 303 and 309). The macro cells A and B are not viewed equally by all mobile units, however. In particular, all mobile units having half-rate voice coders will view the macro cells A and B as being in layer 1 (step 301), while all other mobile units will view the macro cells A and B as being in layer 3 (step 311). For all mobile units having half-rate voice coders, no cells are assigned to layer 3 (step 305), while all other mobile units will view layer 1 as having no cells assigned to it (step 307). Consequently, when establishing a communication with a half-rate capable mobile unit, the network will first attempt to utilize one of the macro cells A and B, and only if this is not possible will the network then attempt to utilize one of the micro cells for the communication. This is because a layer 1 cell is given preference over a layer 2 cell (see FIG. 2b). However, when establishing a communication with a mobile unit that does not have half-rate capability, the network will first attempt to utilize one of the micro cells (e.g., the micro cell C), and only if this is not possible will the network then attempt to utilize one of the macro cells A and B for the communication. This is because a layer 2 cell is given preference over a layer 3 cell (see FIG. 2b).

In another embodiment, the inventive techniques are utilized for evaluating the performance of a radio network or for testing new functionality. In these circumstances, it can be desirable to permit a test mobile unit to see only a sub-set of the full network, or to prioritize cells in a particular way. For example, consider a cell border between two macro cells A and B in an area covered by micro cells as shown in FIG. 1. Normally, most mobiles reside in the micro cells, but when these are congested, the macro cells provide extra capacity. Suppose it is discovered that, for some reason, many calls are dropped in the illustrated geographical area at times when traffic is high. The operator may suspect that this is due to failed handovers between the two macro cells A and B, which happens only when the micro cells are congested. It is desirable to test this hypothesis by moving test mobiles over the cell border between the cells A and B in order to test the handover functionality. However, in order to perform this test, it is necessary to force the test mobile to stay in the macro layer until a handover occurs.

Figure 4:
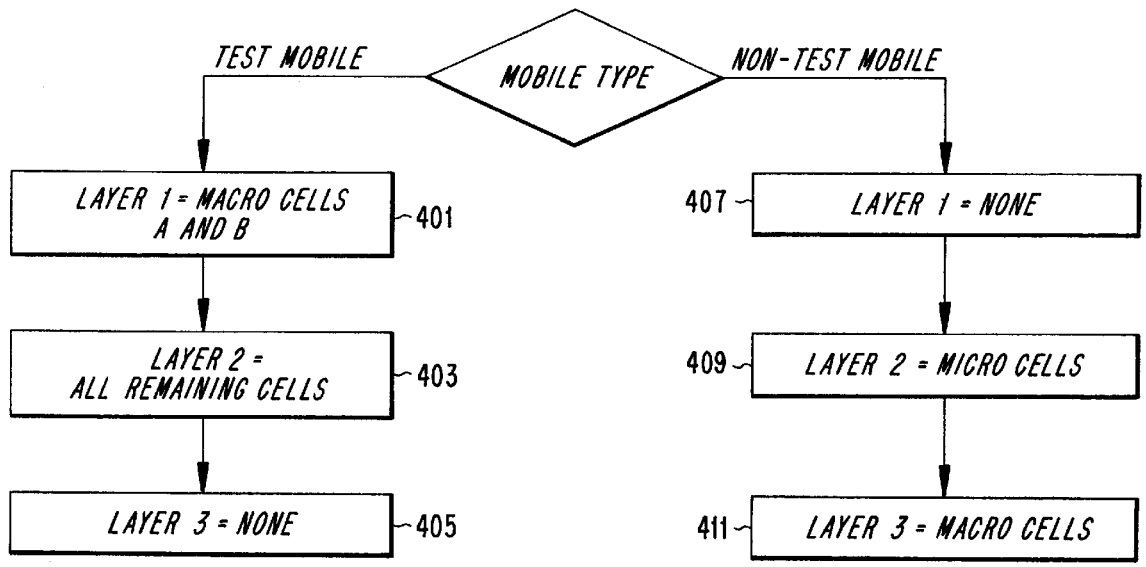
FIG. 4 is a flowchart depicting assignment of cells to priority levels as a function of mobile unit identity and cell type, in accordance with another embodiment of the invention.

Applying the inventive techniques to this problem, a solution is found by redefining the layer structure for the test mobiles as illustrated in FIG. 4. In particular, the macro cells A and B are assigned as layer 1 cells (step 401), while all other cells are layer 2 cells (steps 403 and 405). In this way, a preferred sub-network is defined (cells A and B), in which the test mobiles move. At the same time, non-test mobiles in the system may continue to use the micro cells by defining macro cells A and B as layer 3 cells for these mobiles (step 411), while micro cells are assigned to layer 2 (step 409). (For the non-test mobiles, no cells are assigned to layer 1 (step 407).) Consequently, for the non-test mobiles, the micro cells (e.g., micro cell C) will have a higher priority (i.e., layer 2) than the macro cells A and B (see FIG. 2b).

In a fourth embodiment, location based services are provided. In this example, the location based services are business networks or sub-networks. The importance of mobile telephony as a part of the necessary communications for corporate employees continues to increase. It is expected that mobility within the company premises will be demanded on a large scale as well, as a replacement for a fixed office telephone or as a complement to it. Indoor corporate mobile telephone usage will require indoor cells (usually referred to as "pico cells"), for capacity as well as for coverage reasons. Pico cells are usually conceived as small low-power units deployed either as few cells with a multitude of distributed antenna ports, or as a multitude of cells.

The low power makes some type of Hierarchical Cell Structure (HCS) handling in the radio network control logic necessary. Otherwise, the outdoor high-power cells (i.e., the macro cells) would cause most of the traffic to be carried by the outdoor cells. The macro cells would be congested while the pico cells would remain under-utilized.

Conventional HCS techniques would ensure that all connections within the intended radio coverage area of the pico cells are handled by the pico cells. This will ensure that all company employees making or receiving telephone connections within the company utilize the pico cells. However, the conventional approach creates a problem because it also causes the pico cells to be used by all visitors to the company as well as outside passers-by that happen to enter into stray coverage seeping through windows or doors. A company planning to purchase a mobile corporate network must take this extra unpredictable load into account when dimensioning its network. For a company with many small distributed offices, this extra load is difficult to estimate and may be substantial.

This problem may be solved in accordance with another embodiment of the invention, in which company subscribers see the pico cells as the lowest layer cells, while all other subscribers see them as cells belonging to a layer even higher than the macro cells. With this arrangement, the company subscribers will preferentially use the corporate pico cells, with the outdoor macro cells as spare capacity. By contrast, the remaining (non-company) subscribers will preferentially use the outdoor macro cells, with the corporate pico cells as spare capacity. This allows the company network to be planned and purchased with a known and well-defined traffic base, and the corporate system will be used by those for whom it was intended.

Figure 5:
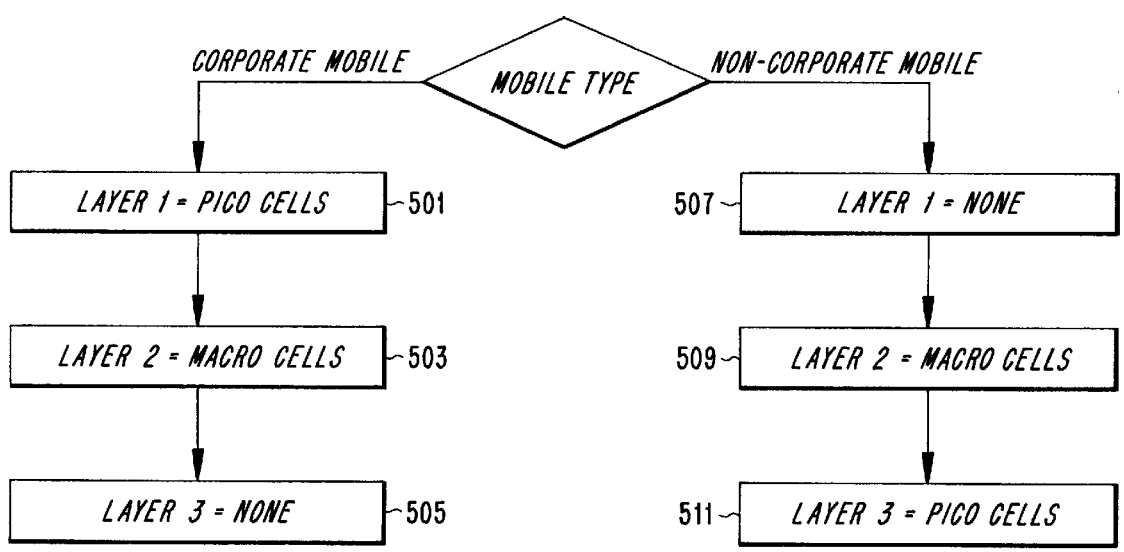
FIG. 5 is a flowchart depicting assignment of cells to priority levels as a function of mobile unit subscriber class and cell class, in accordance with another aspect of the invention.

In an exemplary embodiment, illustrated in FIG. 5, corporate subscribers see the designated company cells (i.e., the pico cells) as layer 1 (step 501), which is the lowest layer (i.e., highest priority). The outdoor macro cells are assigned layer 2 (step 503), so that they can be used as rescue cells in the event that none of the pico cells are available. For the corporate subscribers, no cells are assigned to layer 3 (step 505).

For the non-corporate subscribers, the macro cells are also assigned to layer 2 (step 509). However, in contrast to the corporate subscribers, no cells are assigned to layer 1 (step 507), so that the layer 2 cells have the highest priority. Also, the pico cells are assigned to layer 3 (step 511) so that they may be used as rescue cells in the event that none of the macro cells are available.

Figure 6:
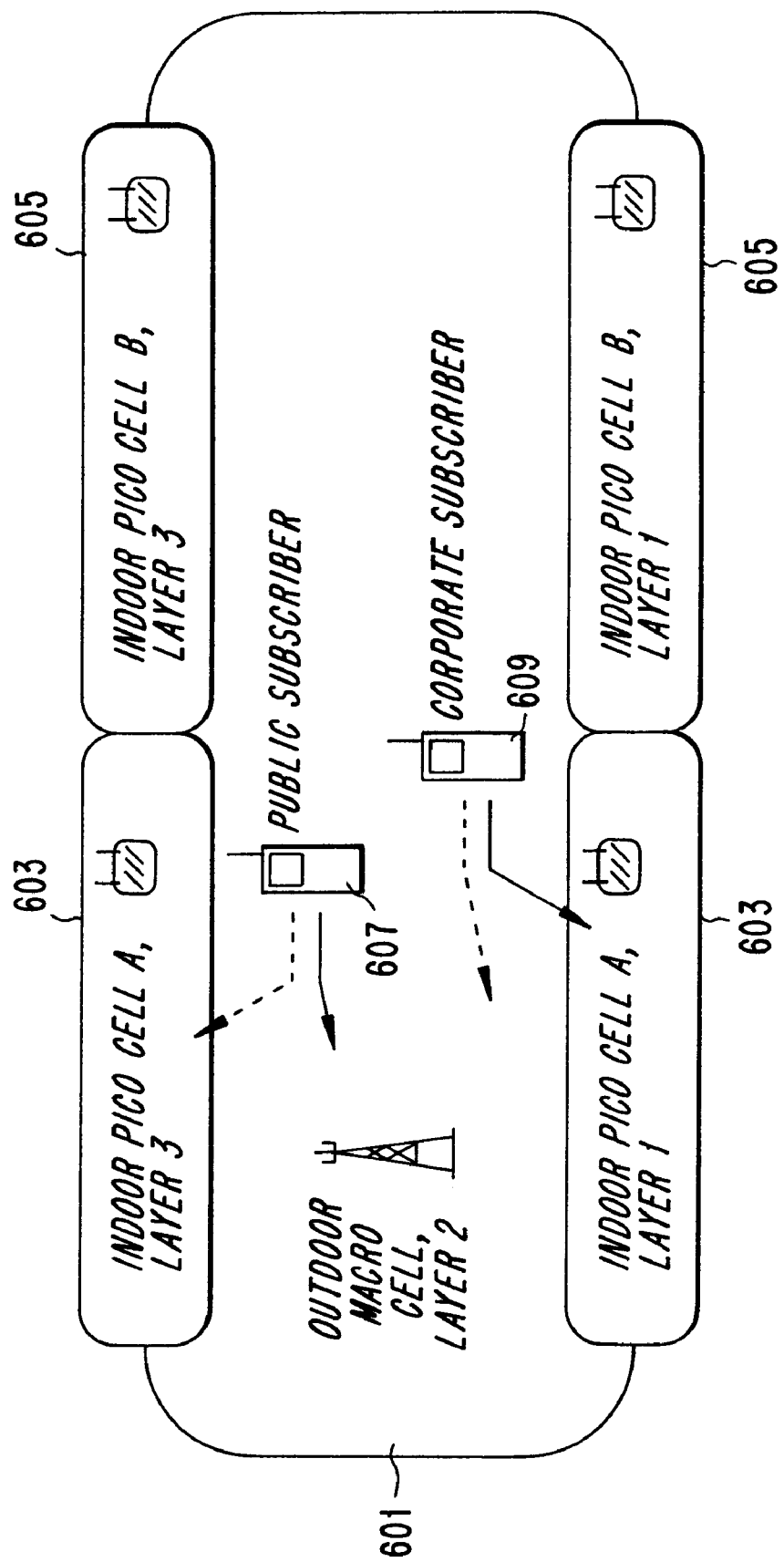
FIG. 6 is an illustration of a system in accordance with one embodiment of the invention in which layer designation is a function of whether subscriptions are characterized as corporate or non-corporate.

An illustration of the resulting system is illustrated in FIG. 6. A service area is shown in which coverage is provided by a macro cell 601. Part of the service area is also covered by an indoor pico cell A 603 and an indoor pico cell B 605. Because of the layering assignments illustrated in FIG. 5, a public subscriber 607 will be assigned to the macro cell 601 whenever possible. Assignment to either indoor pico cell A 603 or indoor pico cell B 605 is made only when the macro cell 601 is not usable, either by congestion, lack of coverage or bad connection quality.

By contrast, the layering assignments illustrated in FIG. 5 will cause a corporate subscriber 609 to be assigned to either indoor pico cell A 603 or indoor pico cell B 605 whenever possible. Assignment to the macro cell 601 is made only when neither the indoor pico cell A 603 nor the indoor pico cell B 605 is usable.

With this mechanism, the load in the corporate cells will mainly come from the corporate employees. They can be dimensioned for the normal telephone traffic occurring at the offices. The load peaks by visitors at large gatherings in the offices, or by parasitic load from passers-by outside the offices will be taken care of by the macro cells, and no extra transceivers have to be purchased for the office system.

One of the primary benefits of this embodiment is that the corporate network becomes more isolated from the public network so as to appear as an independent network. It can be planned, dimensioned and marketed as an integral part of the public land mobile network (PLMN) of a public operator, or as an isolated corporate network in all aspects except frequency allocation. The planning performed by the third party service provider is relatively simple and straightforward, because it only has to consider the normal traffic within the company, and not the visitors and the parasitic stray traffic. At the same time, the part of the network designated to the company interacts with the public part of the network in a completely transparent way. Corporate subscribers see no limitations on their ability to roam outside the company network (if the company allows that), and outsiders visiting the company have full coverage on the company premises.

Figure 7:
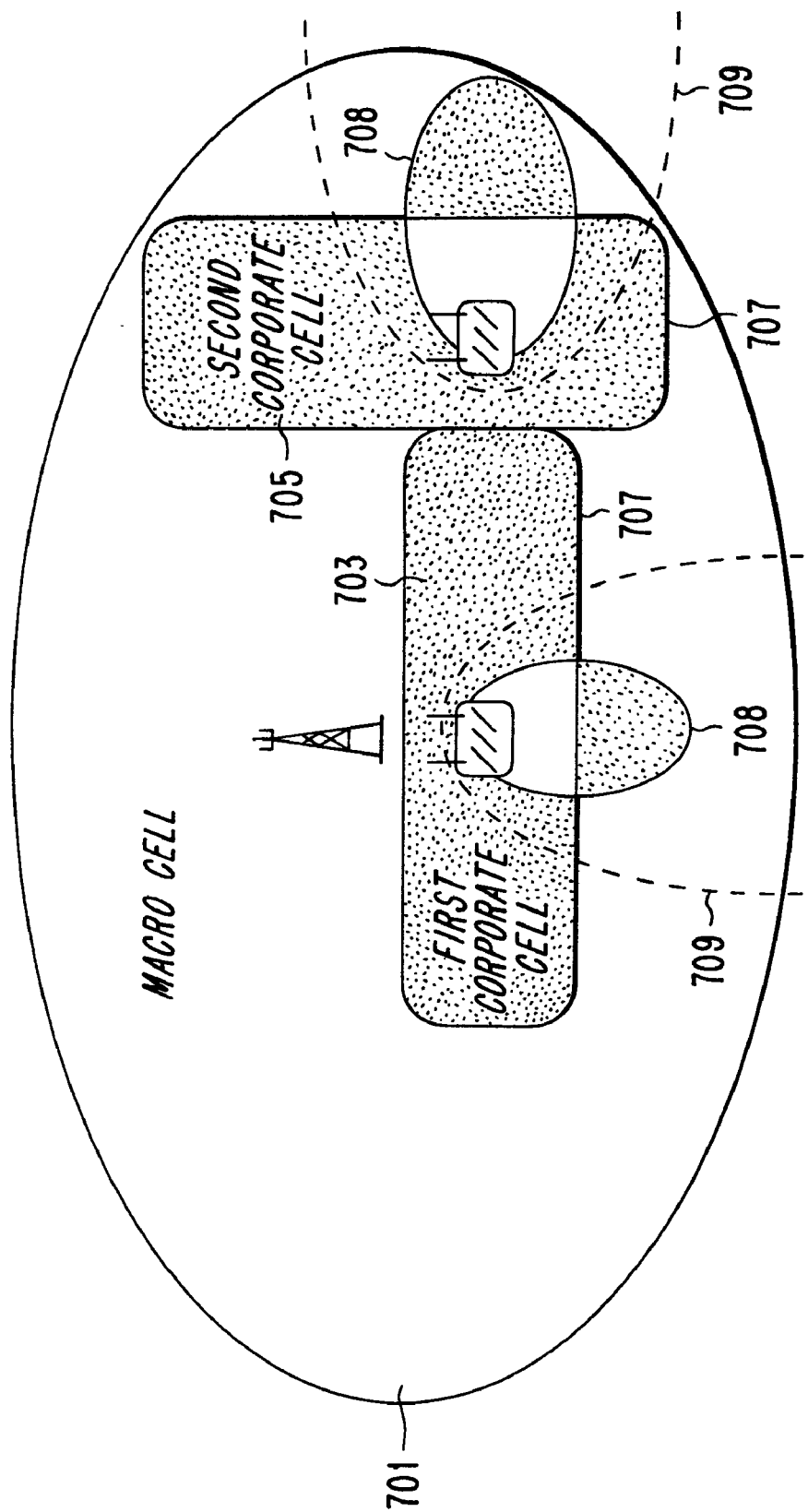
FIG. 7 is an illustration of an exemplary embodiment of the invention implemented for a GSM speech/circuit switched system.

The discussion will now focus on an exemplary embodiment implemented for a GSM speech/circuit switched system. In this example, the tailored HCS functionality is applied for active connections. Referring now to FIG. 7, a service area is defined by a macro cell 701. Within the macro cell 701 are a first corporate cell 703 and a second corporate cell 705. When a mobile is switched on in the service area defined by the macro cell 701, the C1 criterion as specified by GSM Recommendation 05.08, which is published by ETSI and which is hereby incorporated herein by reference, will find the most suitable cell there to camp on. This will not necessarily be either of the first and second corporate cells 703 and 705, because the office cells have very limited coverage with the C1 criterion, as indicated by the lines 708. The shaded areas in FIG. 7 illustrate where the "wrong" initial cell selection will occur.

The C2 criterion as specified by GSM Recommendation 05.08 becomes active after a few seconds, and performs cell reselection. With the use of a parameter for cell reselection offset (CRO), the C1 borders 708 can be extended somewhat, as illustrated by the dashed lines 709.

When setting up a dedicated connection (speech, data, short message service (SMS), subscriber services, etc.), the signalling takes place on the cell where the mobile is camping. Upon performance of the assignment procedure, the active mode locating algorithm gets an opportunity to redirect the connection to the cell of its own preference. This is valid for signalling on the Standalone Dedicated Control Channel (SDCCH) and for signalling on traffic channels (TCH). It is also valid for call setup of SMS, if the mobile switching center (MSC) has been instructed to send an ASSIGNMENT REQUEST signal in this case as well.

In this example, it is assumed that the tailored HCS feature as described herein has been activated, so that for normal (i.e., non-corporate) subscribers, the macro cell 701 has obtained the layer designation 2, and the corporate cells 703 and 705 have been designated as layer 3, which is the lowest priority. Thus, a normal subscriber will be connected to the macro cell 701 even if he or she had been camping on one of the corporate cells 703 and 705. In the event that the subscriber is within the active mode coverage area of the corporate cells 703 and 705 indicated by the lines 707, and the macro cell 701 is congested, the macro cell 701 is the second choice. Corresponding considerations apply with respect to handover.

To implement the technique described in this embodiment, a subscriber group consisting of the corporate employees is constructed. In the subscriber data base, information about the subscriber group and about the service (i.e., tailored HCS) is added.

An area consisting of the designated corporate cells 703 and 705 is defined. Information about the area definition is added in the MSC and/or in the cell data base of the base station controller (BSC). The connection of the service, the subscriber group and the area is performed in the MSC and/or in the home location register (HLR).

Figure 8:
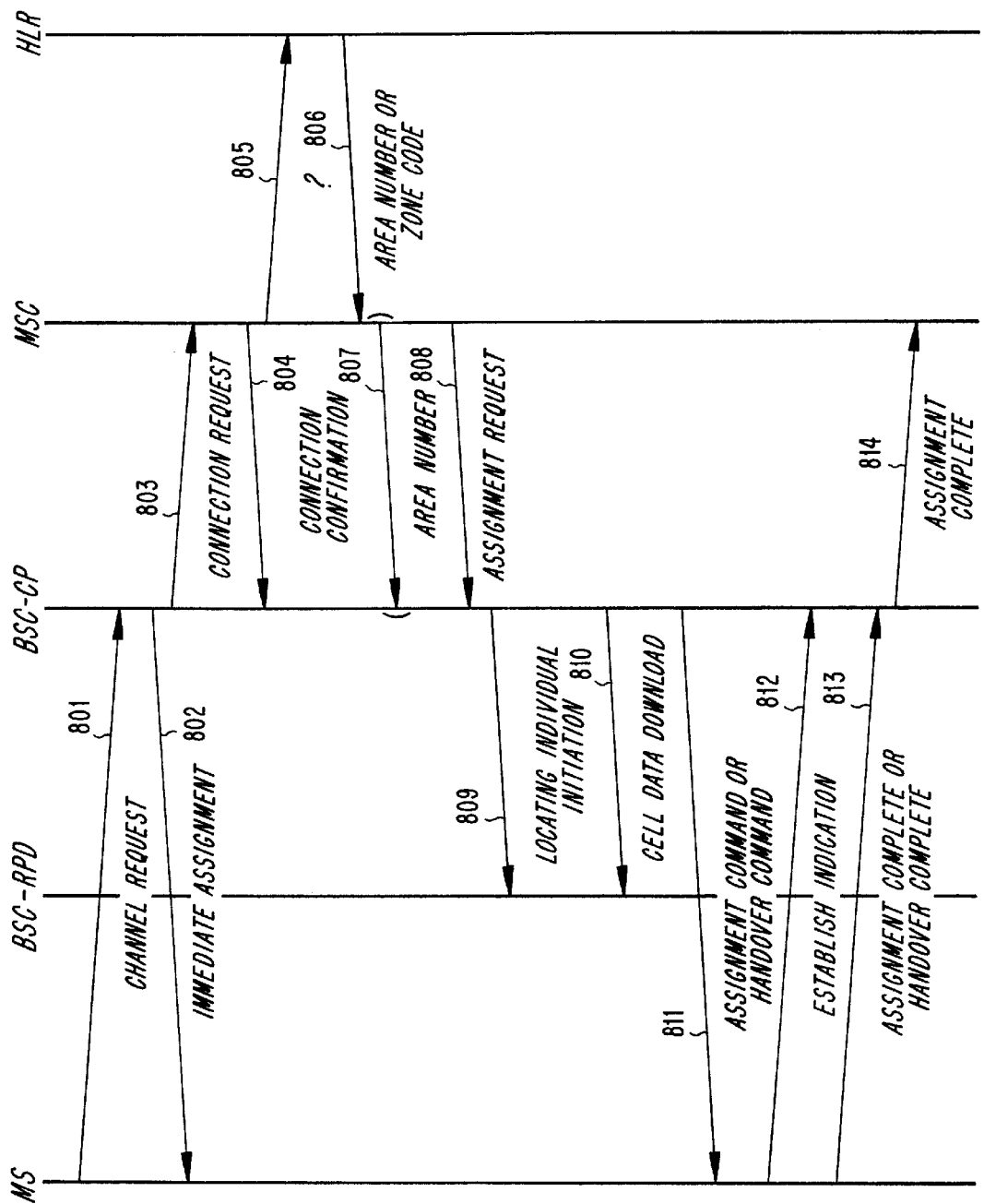
FIG. 8 is a diagram that illustrates a signalling sequence in a GSM system for assigning a cell in accordance with the invention.

FIG. 8 shows an example of a signalling diagram as it could be implemented in a GSM system. The example concerns a mobile originated call setup in the are illustrated by FIG. 7, but all essential features of the invention are shown, and can equally be applied to mobile terminated call setup.

The MS sends a Channel Request 801 to the central processing unit in the BSC (BSC-CP). The BSC answers with an Immediate Assignment signal 802.

After the hand-shaking signals between the BSC and MSC, Connection Request 803 and Connection Confirmation 804 have been exchanged, the MSC sends a request (signal 805) to HLR for the subscriber specific data, that is, the data that defines whether a subscriber belongs to a corporate subscriber group or not. In this description, it is presumed that the subscriber does belong to a corporate subscriber group. The HLR answers with a signal 806 containing information identifying the service (business indoor tailored HCS) and area (cells 703 and 704 in FIG. 7) that the subscription is valid for.

The MSC can forward this information to the BSC either in a separate Area Number signal 807 or within an information field available for user information inside the Assignment Request signal 808. The Area Number signal 807 can be sent as soon as the analysis in MSC/HLR has been completed. The Assignment Request signal 808 is sent when the call has been through connected to the other end point.

The BSC stores the area and service information for use at all handover events throughout the duration of the call. At this instant, a call handling process which is responsible for the running connection supervision, including locating and HCS treatment ("locating individual"), is initiated in the BSC 809. In FIG. 8, this is indicated by a separate BSC entity, BSC-RPD, the regional processing software or hardware. The CP part in the BSC, which holds the central cell data base, downloads parts of this data base to the RPD part, to be used by the locating individual 810. In the process of this download, the layer designation for cells 703 and 705 is redefined from 3 to 1.

The locating individual makes a calculation regarding which cell the call should be connected to, using standard locating and HCS functionality. Since cells 703 and 705 are now layer 1, one of these cells is selected. The cell identification is sent to the MS in Assignment Command or Handover Command 811. The Assignment Command can be used if the previous signalling has been maintained through the same cell. The Handover Command must be used if there is a cell change.

The Establish Indication signal 812 is sent to the new cell (703 or 705). The remainder of the signalling (Assignment complete or Handover Complete signals 813 and 814) is the conclusion of the procedure.

In the case of handover, the area and service information is already stored in the BSC. Therefore, the signalling diagram in FIG. 8 is valid for the handover case from signal 809 and forward, using the Handover Command 811 and Handover Complete 813 and 814.

If implemented as a separate signal 807, which is a preferred embodiment, the transfer of area and service information from the MSC/HLR to the BSC should preferably be completed before the assignment procedure is concluded with a traffic channel assignment. If this does not occur, the corporate cells 703 and 705 will appear as layer 3 cells for all subscribers at the time of assignment, but the call setup will not otherwise be affected. Therefore, the call will be set up to the layer 2 macro cell 701 instead. The layer redefinition will be possible as soon as the information has reached the BSC. A corrective handover can then take place from the layer 2 macro cell 701 to one of the corporate cells 703 and 705, now redefined from layer 3 to layer 1.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, embodiments have been described in which predefined capabilities include half-rate coder capability and GPRS capability. Also, embodiments have been described in which predefined user classes include company employees/non-employees and test/non-test mobile groups. It should be understood, however, that these particular predefined capabilities and user classes are merely exemplary, and that one having ordinary skill in the art could easily apply the inventive concepts to other types of predefined capabilities and user classes. Furthermore, the inventive techniques can easily be applied to systems that operate in accordance with standards other than the exemplary GSM system which has been described herein.

Additionally, selection of a server cell in accordance with the various inventive techniques described herein can be performed by selecting a base station that serves a selected candidate cell. Alternatively, selection of a server cell may take other forms, such as selection of a satellite or other component that serves a selected candidate cell.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of selecting a server for use by a designated one of a number of mobile units in a cellular communications system comprising a plurality of cells having different service areas with respect to one another, the method comprising the steps of:

for each of the mobile units, assigning to each cell a category of preference for selection with respect to each other cell within the system, wherein for at least one of the cells, the assigned category of preference associated with a first mobile unit is different from the assigned category of preference associated with a second mobile unit;

determining for the designated mobile unit the assigned category of preference for each of a number of candidate cells; and selecting for the designated mobile unit as serving cell a first one of the candidate cells based upon whether the first one of the candidate cells has a higher category of preference than another of the candidate cells, wherein the category of preference is a relative priority designation that is a function of a current server cell identity, and wherein the relative priority designation indicates one of n+m+1 possible priority levels relative to a currently serving cell, wherein n of the possible priority levels each indicate a priority level below the currently serving cell, one of the possible priority levels indicates "equal priority with the currently serving cell", and m of the possible priority levels each indicate a priority level above the currently serving cell, wherein n and m are each integers greater than or equal to zero.

2. A method of assigning a cell for use by a designated one of a plurality of mobile units in a cellular communications system comprising a plurality of cells having different service areas with respect to one another, wherein the plurality of mobile units includes at least one mobile unit of a first mobile type that has a predefined capability, and at least one mobile unit of a second mobile type that does not have the predefined capability, and the plurality of cells includes at least one cell of a first cell type that supports the predefined capability and at least one cell of a second cell type that does not support the predefined capability, the method comprising the steps of:

a) attempting to assign a cell of the first cell type to the designated mobile unit before attempting to assign a cell of the second cell type to the designated mobile unit if the designated mobile unit is of the first mobile type; and b) attempting to assign a cell of the second cell type to the designated mobile unit before attempting to assign a cell of the first cell type to the designated mobile unit if the designated mobile unit is of the second mobile type, wherein:

step a) comprises the steps of:
defining a first level of cells to be cells of the first cell type;
defining a second level of cells to be cells of the second type;
defining a third level of cells to be no cells;
attempting to assign a cell from the first level of cells to the designated mobile unit;
if no cell from the first level of cells has been assigned, then attempting to assign a cell from the second level of cells to the designated mobile unit; and
if no cell from the first or second levels of cells has been assigned, then attempting to assign a cell from the third level of cells to the designated mobile unit; and step b) comprises the steps of:
defining a first level of cells to be no cells;
defining a second level of cells to be cells of the second type;
defining a third level of cells to be cells of the first type;
attempting to assign a cell from the first level of cells to the designated mobile unit;
if no cell from the first level of cells has been assigned, then attempting to assign a cell from the second level of cells to the designated mobile unit; and
if no cell from the first or second levels of cells has been assigned, then attempting to assign a cell from the third level of cells to the designated mobile unit.

3. The method of claim 2, wherein the predefined capability is half-rate voice coder capability.

4. The method of claim 2, wherein the predefined capability is General Packet Radio Service (GPRS) capability.

5. A method of assigning a cell for use by a designated one of a plurality of mobile units in a cellular communications system comprising a plurality of cells having different service areas with respect to one another, wherein the plurality of mobile units includes at least one mobile unit of a first mobile type associated with a predefined user group, and at least one mobile unit of a second mobile type that is not associated with the predefined user group, and the plurality of cells includes at least one cell of a first cell type that is associated with the predefined user group and at least one cell of a second cell type that is not associated with the predefined user group, the method comprising the steps of:

a) attempting to assign a cell of the first cell type to the designated mobile unit before attempting to assign a cell of the second cell type to the designated mobile unit if the designated mobile unit is of the first mobile type; and attempting to assign a cell of the second cell type to the designated mobile unit before attempting to assign a cell of the first cell type to the designated mobile unit if the designated mobile unit is of the second mobile type, wherein:

step a) comprises the steps of:
defining a first level of cells to be cells of the first cell type;
defining a second level of cells to be cells of the second type;
defining a third level of cells to be no cells;
attempting to assign a cell from the first level of cells to the designated mobile unit;
if no cell from the first level of cells has been assigned, then attempting to assign a cell from the second level of cells to the designated mobile unit; and
if no cell from the first or second levels of cells has been assigned, then attempting to assign a cell from the third level of cells to the designated mobile unit; and step b) comprises the steps of:
defining a first level of cells to be no cells;
defining a second level of cells to be cells of the second type;
defining a third level of cells to be cells of the first type;
attempting to assign a cell from the first level of cells to the designated mobile unit;
if no cell from the first level of cells has been assigned, then attempting to assign a cell from the second level of cells to the designated mobile unit; and
if no cell from the first or second levels of cells has been assigned, then attempting to assign a cell from the third level of cells to the designated mobile unit.

6. The method of claim 5, wherein the predefined user group is a group of company employees.

7. The method of claim 5, wherein the predefined user group is a group comprising at least one test mobile unit.

8. An apparatus for selecting a server for use by a designated one of a number of mobile units in a cellular communications system comprising a plurality of cells having different service areas with respect to one another, the apparatus comprising:

means for assigning to each cell a category of preference for each of the mobile units, the category of preference indicating a preference level for selection with respect to each other cell within the system, wherein for at least one of the cells, the assigned category of preference associated with a first mobile unit is different from the assigned category of preference associated with a second mobile unit;

means for determining for the designated mobile unit the assigned category of preference for each of a number of candidate cells; and means for selecting for the designated mobile unit as serving cell a first one of the candidate cells based upon whether the first one of the candidate cells has a higher category of preference than another of the candidate cells, wherein the category of preference is a relative priority designation that is a function of a current server cell identity, and wherein the relative priority designation indicates one of $n+m+1$ possible priority levels relative to a currently serving cell, wherein n of the possible priority levels each indicate a priority level below the currently serving cell, one of the possible priority levels indicates "equal priority with the currently serving cell", and m of the possible priority levels each indicate a priority level above the currently serving cell, wherein n and m are each integers greater than or equal to zero.

9. An apparatus for assigning a cell for use by a designated one of a plurality of mobile units in a cellular communications system comprising a plurality of cells having different service areas with respect to one another, wherein the plurality of mobile units includes at least one mobile unit of a first mobile type that has a predefined capability, and at least one mobile unit of a second mobile type that does not have the predefined capability, and the plurality of cells includes at least one cell of a first cell type that supports the predefined capability and at least one cell of a second cell type that does not support the predefined capability, the apparatus comprising:

first means for first attempting to assign a cell of the first cell type to the designated mobile unit before attempting to assign a cell of the second cell type to the designated mobile unit if the designated mobile unit is of the first mobile type; and second means for attempting to assign a cell of the second cell type to the designated mobile unit before attempting to assign a cell of the first cell type to the designated mobile unit if the designated mobile unit is of the second mobile type, wherein:
the first means comprises:
means for defining a first level of cells to be cells of the first cell type;
means for defining a second level of cells to be cells of the second type;
means for defining a third level of cells to be no cells;
means for attempting to assign a cell from the first level of cells to the designated mobile unit;
means for attempting to assign a cell from the second level of cells to the designated mobile unit if no cell from the first level of cells has been assigned; and
means for attempting to assign a cell from the third level of cells to the designated mobile unit if no cell from the first or second levels of cells has been assigned; and
the second means comprises:
means for defining a first level of cells to be no cells;
means for defining a second level of cells to be cells of the second type;
means for defining a third level of cells to be cells of the first type;
means for attempting to assign a cell from the first level of cells to the designated mobile unit;
means for attempting to assign a cell from the second level of cells to the designated mobile unit if no cell from the first level of cells has been assigned; and
means for attempting to assign a cell from the third level of cells to the designated mobile unit if no cell from the first or second levels of cells has been assigned.

10. The apparatus of claim 9, wherein the predefined capability is half-rate voice coder capability.

11. The apparatus of claim 9, wherein the predefined capability is General Packet Radio Service (GPRS) capability.

12. An apparatus for assigning a cell for use by a designated one of a plurality of mobile units in a cellular communications system comprising a plurality of cells having different service areas with respect to one another, wherein the plurality of mobile units includes at least one mobile unit of a first mobile type associated with a predefined user group, and at least one mobile unit of a second mobile type that is not associated with the predefined user group, and the plurality of cells includes at least one cell of a first cell type that is associated with the predefined user group and at least one cell of a second cell type that is not associated with the predefined user group, the apparatus comprising:

first means for attempting to assign a cell of the first cell type to the designated mobile unit before attempting to assign a cell of the second cell type to the designated mobile unit if the designated mobile unit is of the first mobile type; and second means for attempting to assign a cell of the second cell type to the designated mobile unit before attempting to assign a cell of the first cell type to the designated mobile unit if the designated mobile unit is of the second mobile type, wherein:
the first means comprises:
means for defining a first level of cells to be cells of the first cell type;
means for defining a second level of cells to be cells of the second type;
means for defining a third level of cells to be no cells;
means for attempting to assign a cell from the first level of cells to the designated mobile unit;
means for attempting to assign a cell from the second level of cells to the designated mobile unit if no cell from the first level of cells has been assigned; and means for attempting to assign a cell from the third level of cells to the designated mobile unit if no cell from the first or second levels of cells has been assigned; and the second means comprises:

means for defining a first level of cells to be no cells;

means for defining a second level of cells to be cells of the second type;

means for defining a third level of cells to be cells of the first type;

means for attempting to assign a cell from the first level of cells to the designated mobile unit;

means for attempting to assign a cell from the second level of cells to the designated mobile unit if no cell from the first level of cells has been assigned; and means for attempting to assign a cell from the third level of cells to the designated mobile unit if no cell from the first or second levels of cells has been assigned.

13. The apparatus of claim 12, wherein the predefined user group is a group of company employees.

14. The apparatus of claim 12, wherein the predefined user group is a group comprising at least one test mobile unit.

\* \* \* \* \*